(12) United States Patent
Brückner et al.

(10) Patent No.: US 9,768,466 B2
(45) Date of Patent: Sep. 19, 2017

(54) LITHIUM-SULPHUR (LI—S) BATTERY WITH HIGH CYCLE STABILITY AND METHOD FOR OPERATION THEREOF

(71) Applicants: Fraunhofer-Gesellschaft zur Foerderung der angewandten Forschung e.V., Munich (DE); Technische Universität Dresden, Dresden (DE)

(72) Inventors: Jan Brückner, Dresden (DE); Holger Althues, Dresden (DE); Stefan Kaskel, Dresden (DE); Sören Thieme, Dresden (DE); Ingolf Bauer, Radebeul (DE)

(73) Assignees: Technische Universität Dresden, Dresden (DE); Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 170 days.

(21) Appl. No.: 14/428,346

(22) PCT Filed: Sep. 13, 2013

(86) PCT No.: PCT/EP2013/068977
§ 371 (c)(1),
(2) Date: Mar. 13, 2015

(87) PCT Pub. No.: WO2014/041108
PCT Pub. Date: Mar. 20, 2014

(65) Prior Publication Data
US 2015/0249260 A1 Sep. 3, 2015

(30) Foreign Application Priority Data
Sep. 14, 2012 (DE) .................. 10 2012 018 622

(51) Int. Cl.
| | | |
|---|---|---|
| H02J 7/00 | (2006.01) |
| H01M 10/052 | (2010.01) |
| H01M 4/04 | (2006.01) |
| H01M 4/134 | (2010.01) |
| H01M 4/136 | (2010.01) |
| H01M 4/38 | (2006.01) |
| H01M 4/62 | (2006.01) |
| H01M 4/66 | (2006.01) |
| H01M 10/056 | (2010.01) |
| H01M 10/44 | (2006.01) |
| H01M 2/16 | (2006.01) |
| H01M 10/0565 | (2010.01) |
| H01M 10/0568 | (2010.01) |
| H01M 10/42 | (2006.01) |

(52) U.S. Cl.
CPC ....... *H01M 10/052* (2013.01); *H01M 2/1653* (2013.01); *H01M 4/0426* (2013.01); *H01M 4/0428* (2013.01); *H01M 4/134* (2013.01);
*H01M 4/136* (2013.01); *H01M 4/38* (2013.01); *H01M 4/386* (2013.01); *H01M 4/387* (2013.01); *H01M 4/622* (2013.01); *H01M 4/623* (2013.01); *H01M 4/625* (2013.01); *H01M 4/663* (2013.01); *H01M 10/056* (2013.01); *H01M 10/0565* (2013.01); *H01M 10/0568* (2013.01); *H01M 10/44* (2013.01); *H01M 10/448* (2013.01); *H01M 2010/4292* (2013.01)

(58) Field of Classification Search
CPC ....... H02J 7/0031; H02J 7/0047; Y02E 60/12; G01R 31/3648; H01M 10/48
USPC ........................................ 320/136
See application file for complete search history.

(56) References Cited

U.S. PATENT DOCUMENTS

| | | | |
|---|---|---|---|
| 6,030,720 A | 2/2000 | Chu et al. | |
| 7,358,012 B2 * | 4/2008 | Mikhaylik | H01M 4/382 429/218.1 |
| 2002/0182508 A1 | 12/2002 | Nimon et al. | |
| 2004/0197660 A1 | 10/2004 | Sheem et al. | |
| 2005/0106464 A1 | 5/2005 | Yoshida et al. | |
| 2007/0258192 A1 | 11/2007 | Schindall et al. | |
| 2008/0100264 A1 * | 5/2008 | Kolosnitsyn | H01M 4/133 320/127 |
| 2011/0163274 A1 * | 7/2011 | Plee | H01M 4/134 252/503 |
| 2011/0200875 A1 | 8/2011 | Miyuki et al. | |

(Continued)

FOREIGN PATENT DOCUMENTS

| | | |
|---|---|---|
| CN | 101194384 A | 6/2008 |
| CN | 102763250 A | 10/2012 |

(Continued)

OTHER PUBLICATIONS

Elazari, Ran et al., "Rechargeable Lithiated Silicon-Sulfur (SLS) Battery Prototypes Electrochemistry Communications", 2012, vol. 14, 4 pages.

(Continued)

*Primary Examiner* — Arun Williams
(74) *Attorney, Agent, or Firm* — Faegre Baker Daniels LLP

(57) ABSTRACT

A Li—S battery including a cathode and an anode and at least one of a lithium-containing liquid electrolyte, gel electrolyte, and solid electrolyte disposed between the cathode and the anode. The cathode includes at least one of an electrically conductive carbon material, an electrochemically active cathode material that comprises sulphur, and at least partially fibrillar plastic material. The anode includes a conducting substrate which is coated at least in regions with at least one of silicon and tin. A method for operation thereof.

18 Claims, 2 Drawing Sheets

(56) References Cited

U.S. PATENT DOCUMENTS

| | | | |
|---|---|---|---|
| 2011/0200883 A1 | 8/2011 | Cui et al. | |
| 2011/0281156 A1 | 11/2011 | Boren et al. | |
| 2012/0115259 A1* | 5/2012 | Lee .................... | H01M 10/052 438/19 |
| 2012/0229096 A1 | 9/2012 | Nazri | |
| 2013/0209880 A1 | 8/2013 | Nozue et al. | |

FOREIGN PATENT DOCUMENTS

| | | |
|---|---|---|
| DE | 102012018622 A1 | 3/2014 |
| EP | 2306563 A1 | 4/2011 |
| EP | 2458664 A2 | 5/2012 |
| JP | 200571698 A | 3/2005 |
| JP | 2007518230 A | 3/2005 |
| JP | 2005150038 A | 6/2005 |
| JP | 2008130229 A | 11/2006 |
| WO | 2005069409 A2 | 7/2005 |
| WO | 2010044437 A1 | 7/2010 |
| WO | 2012070184 A1 | 5/2012 |
| WO | 2014041108 A1 | 3/2014 |

OTHER PUBLICATIONS

International Search Report and Written Opinion issued in PCT/EP2013/068977, mailed Dec. 12, 2013, 31 pages.

\* cited by examiner

LITHIUM-SULPHUR (LI—S) BATTERY WITH HIGH CYCLE STABILITY AND METHOD FOR OPERATION THEREOF

CROSS-REFERENCE TO RELATED APPLICATIONS

This application is a national phase application of PCT Application No. PCT/EP2013/068977, internationally filed Sep. 13, 2013, which claims priority to German Application No. 10 2012 018 622.3, filed Sep. 14, 2012, all of which are herein incorporated by reference in their entirety.

TECHNICAL FIELD

Li—S batteries and in particular, Li—S batteries that have improved cycle stability and, at the same time, almost perfect charging efficiency.

BACKGROUND

Typically, in Li—S batteries, Li metal anodes are used. These lead to high capacities and are easily producible, however a few disadvantages are associated therewith. Li metal is very reactive and, in the production and in the use of the cells, can lead to safety problems (so-called "thermal run-away" from the melting point of 181° C. for metallic lithium). Furthermore, Li metal is susceptible to dendritic growth during cycling, as a consequence of which the result is a great increase in the surface area and an increase in reactivity.

In addition, as a result of the grown dendrites, short circuits in the cell can be produced, which leads to destruction of the cell and also to additional safety problems. Finally, the cycle stability is generally limited, when using metallic lithium, above all because of the dendritic growth of lithium, to 100 to at most 200 cycles.

In order to solve this problem, graphite anodes have been used in Li batteries to date. The stability and safety could hence be crucially improved, however at the cost of lower capacity of the batteries. For a sulphur battery, the problem occurs that graphite anodes are not possible for various reasons. As an example of this, the intercalation of solvent of the sulphur electrolyte can be mentioned, which leads to the destruction of the graphite anode.

Initial approaches show the potential for replacing the lithium anode with alloy anodes (Si, Sn) with a very high capacity. These alloy anodes in fact in principle solve the problems which are associated with Li dendrites, but to date have also not been particularly cycle-stable. The high expansion of Si (and Sn) which is caused by the lithiation is hereby problematic. The expansion is for example 320% for Si and 260% for Sn (Zhang, W.-J., Journal of Power Sources, 196: 13-24, 2011).

Production of good Si and Sn anodes (above all for Li ion cells) is the subject of current research. Publications relating to Si and Sn in Li—S cells show the applicability in principle of these alloy anodes but verify the cycle instability of these systems. The reason for the cycle instability is generally degradation effects on the anode- and also cathode side.

Difficulties occur also from the lithiation either of the anode or of the cathode. Thus, only a very low partial lithiation and hence low capacity was able to be achieved if copper was used as carrier substrate and current conductor for an anode material (e.g. silicon thin film) (Elazari, R. et al., Electrochemistry Communications, 14: 21-24, 2012).

For an anode made of silicon nanowire, likewise only a very low capacity could be achieved (Yang, Y. et al., Nano Letters, 10: 1486-1491, 2010).

Furthermore, when using a cathode made of carbon-sulphur composite material and a lithiated anode made of carbon-silicon composite material, a high capacity of approx. 300 mAh/g could be achieved but only low stability could be attained.

Also Li—S cells based on Li metal anodes in which particularly complex coating of lithium was used are known (U.S. Pat. No. 7,358,012 B2).

SUMMARY

The present disclosure describes Li—S batteries which have both a high capacity and high cycle stability, a method for operation of a Li—S battery according to the disclosure, and uses of the Li—S battery according to the disclosure.

The subject according to the disclosure is intended to be explained in more detail with reference to the subsequent Figures and examples, without wishing to restrict said subject to the specific embodiments illustrated here.

DETAILED DESCRIPTION

Figure 1:
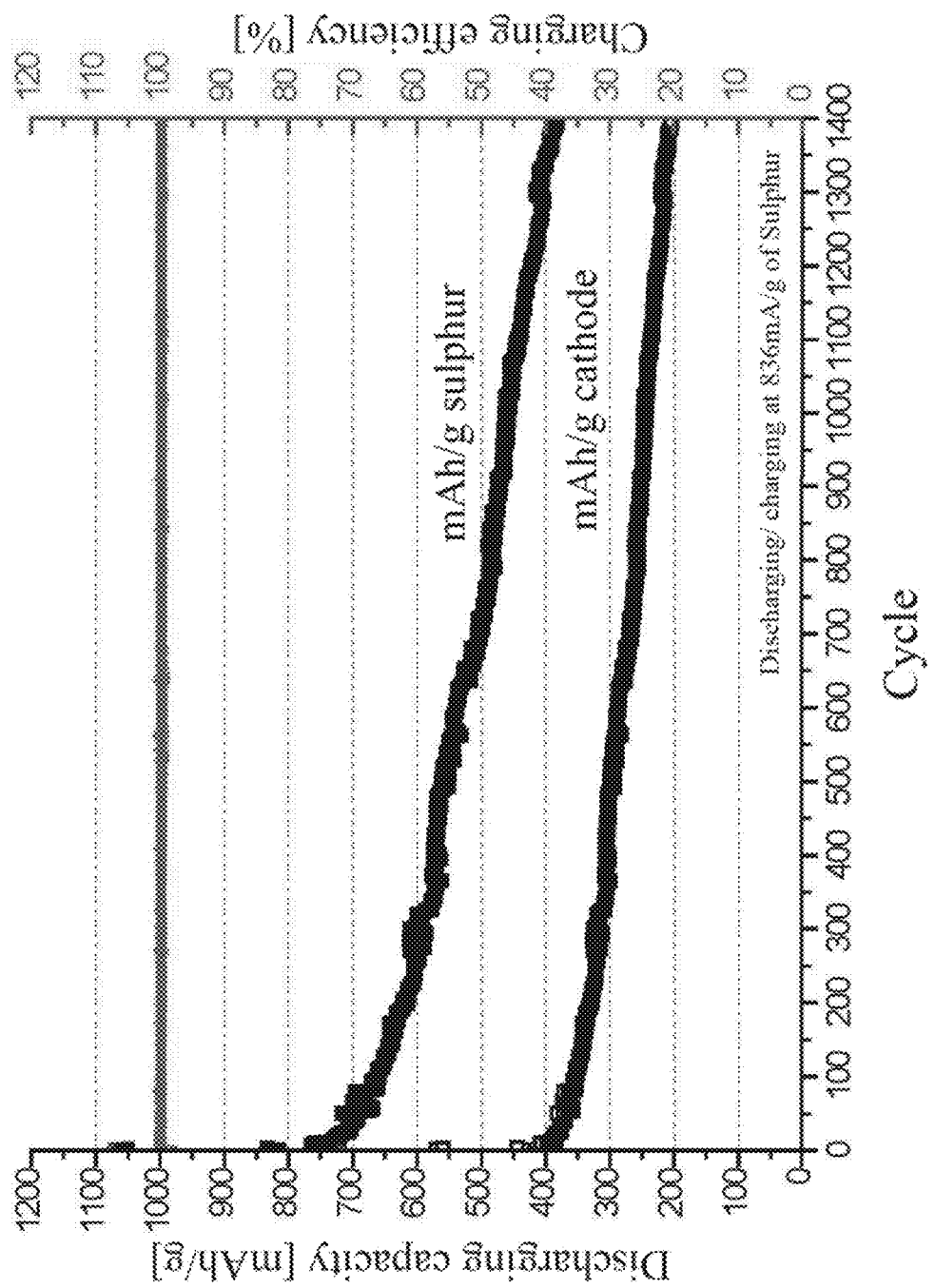
FIG. 1 is a diagram illustrating the discharging capacity per gram of sulphur and per gram of cathode of a Li—S battery according to the disclosure, given by way of example, compared with a battery from the state of the art.

Hence a Li—S battery is provided, comprising
a) a cathode comprising an electrically conductive carbon material, an electrochemically active cathode material which comprises sulphur or consists thereof, and/or at least partially fibrillar plastic material;
b) an anode comprising a conducting substrate which is coated at least in regions with silicon and/or tin; and
c) a lithium-containing liquid electrolyte, gel electrolyte and/or solid electrolyte disposed between cathode and anode.

Surprisingly it was established that the batteries according to the disclosure have almost perfect charging efficiency which remains almost unchanged at the maximum possible value even above 1,000 charging-/discharging cycles.

A further advantage of the Li—S battery is that it has a simple construction and a relatively low weight. Furthermore, the battery has a higher surface capacity and higher gravimetric capacity compared with Li—S batteries from the state of the art. Capacity values of ≥1,050 mAh/g and even 1,500 mAh/g and a surface capacity of >4 mAh/cm$^2$ can be achieved.

Furthermore, the battery has high long-term stability since the cathode of the Li—S battery comprises fibrillar plastic material and/or highly porous carbon and hence resists high mechanical force effects. This matrix structure for sulphur and sulphur-containing species has a high internal surface and large pore volume for adsorption of polysulphides and also deposition/contacting of a thin layer of S and/or Li$_2$S. As a result, a volume expansion of the active material can be compensated for by a free pore volume.

The Li—S battery according to the disclosure has improved rate behaviour and also improved stability relative to the state of the art.

A cathode, as can be contained in the Li—S battery according to this disclosure, is known for example from DE 10 2012 203 019.0. With respect to possible embodiments of the cathode and also possible production methods, reference is made to this patent application, the disclosure content of which is also in this respect made the subject of the present application.

In some embodiments of the disclosure, the battery is characterised in that the cathode, relative to the total weight of the cathode, comprises
a) in some embodiments 40-90% by weight, in some embodiments 50-80% by weight, and in some embodiments 60-75% by weight, of electrochemically active cathode material;
b) in some embodiments 1-55% by weight, in some embodiments 5-35% by weight, and in some embodiments 10-25% by weight, of electrically conductive carbon material; and/or
c) in some embodiments 2-50% by weight, in some embodiments 3-20% by weight, and in some embodiments 5-10% by weight, of plastic material.

The cathode of the battery according to the disclosure can comprise in addition
a) an electrochemically active cathode material comprising sulphur or a lithium-sulphur compound, preferably $Li_2S$;
b) as electrically conductive carbon material, porous carbon, carbon black, graphene, graphite, diamond-like carbon (DLC), graphite-like carbon (GLC), carbon fibres, carbon nanotubes and/or carbon hollow balls, and/or
c) as partially fibrillar plastic material, partially fibrillar polytetrafluoroethylene.

In some embodiments,
a) the carbon nanotubes have a diameter of 0.1 to 100 nm, in some embodiments a diameter of 1 to 50 nm, and in some embodiments a diameter of 5 to 25 nm; and/or
b) in some embodiments the carbon fibres have a diameter of 1 to 100 μm, in some embodiments a diameter of 5 to 50 μm, and in some embodiments a diameter of 10 to 20 μm.

The cathode can be configured as a film, in some embodiments with a thickness of 20-1,000 μm, in some embodiments with a thickness of 50-500 μm, and in some embodiments with a thickness of 80-300 μm. Optionally, the cathode is applied on an electrically conductive substrate, preferably on a metal and/or carbon material, but can also be used separately in the Li—S battery according to the disclosure, i.e. without being applied on a substrate.

In some embodiments, the electrochemically active cathode material is applied at least in regions on the surface of the electrically conductive carbon material or the electrically conductive carbon material is applied on the surface of the active cathode material.

In some embodiments of the Li—S battery according to the disclosure, the coating of the anode is a conformal coating, in some embodiments a PVD- and/or CVD coating, and in some embodiments a PE-CVD coating. The coating with PE-CVD has the advantage that, relative to a magnetron coating, a more homogeneous coating takes place.

The conducting substrate of the anode can be present in fibrillar form, in some embodiments in the form of a three-dimensional fibrillar network, and in some embodiments in the form of fibres, nanofibres or nanotubes or randomly orientated fabrics and/or fleeces of the previously described types of fibres.

If the anode is present in fibrillar form, improved penetration compared with a magnetron coating was observed in production of the coating. This applies above all for a coating via PE-CVD, here a homogeneous coating over the entire depth of the fibrillar anode or of the fibrillar, three-dimensional network being able to be achieved.

In this respect, the fibres and/or the fibres or nanofibres or nanotubes of the anode forming the basis of the randomly orientated fabrics or fleeces can have in some embodiments a diameter of 1 nm to 500 μm, in some embodiments a diameter of 10 nm to 200 μm, in some embodiments a diameter of 100 nm to 100 μm, in some embodiments a diameter of 1 to 100 μm, in some embodiments a diameter of 5 to 50 μm, and in some embodiments a diameter of 10 to 20 μm.

The thickness of the coating of the anode can be in the range of 0.1 to 50 μm, in some embodiments 0.5 to 20 μm, and in some embodiments 0.5 to 2 μm. The fibrillar, conducting substrate of the anode can comprise a material selected from the group consisting of carbon, graphite, graphene, diamond-like carbon (DLC), carbon black and carbon nanotubes or consist thereof.

In some embodiments, the anode comprises silicon and/or tin in a total quantity, relative to the total mass of the anode, of 0.1 to 90% by weight, in some embodiments of 20 to 80% by weight, and in some embodiments of 40 to 70% by weight.

In some embodiments, the anode is lithiated. This can have been effected by a lithium metal foil having been pressed onto the anode (e.g. Si anode) and by the lithiation having taken place after an active time of approx. 4 to 12 hours.

In some embodiments, the anode can have a total thickness of 10 to 1,000 μm, in some embodiments of 20 to 500 μm, and in some embodiments of 50 to 120 μm.

The electrolyte of the battery according to the disclosure is selected from the group consisting of solutions or suspensions of at least one lithium salt in at least one cyclic or non-cyclic ether, and in some embodiments solutions or suspensions of
a) lithium-bis(trifluoromethanesulphonyl)imide (LiTFSI),
b) lithium trifluoromethanesulphonate; and/or
c) lithium nitrate;
in
i) dimethoxyethane (DME):
ii) tetraethylene glycol dimethyl ether (TEGDME, IUPAC: 2,5,8,11,14-pentaoxapentadecane); and/or
iii) 1,3-dioxolane (DOL).

It was found that the battery according to the disclosure comprising an electrolyte, which comprises lithium nitrate, has a more constant charging efficiency relative to a battery which comprises no lithium nitrate in the electrolyte.

Furthermore, in some embodiments, at least one separator is disposed between cathode and anode, the separator comprising, a permeable film made of a thermoplastic material, in particular PE, PP and/or PET, or consisting thereof.

In some embodiments of the battery according to the disclosure, anode and cathode are coordinated to each other with respect to their capacity and/or their possible charging-/discharging rate.

In some embodiments, the anode is significantly overdimensioned with respect to its capacity per electrode surface relative to the cathode, i.e. the anode is designed to be greater with respect to its capacity compared with the cathode. In the case of long cycle times, this is particularly advantageous since a gentle mode of operation of the anode is consequently made possible. Hence, this improves overall the performance of the total cell. In the application examples, the capacity of the anode (measured in the half cell) is 75% higher than that of the cathode (likewise measured in the half cell). Consequently, the anode is not fully loaded during charging/discharging and the volume changes and stresses are reduced.

Furthermore, a method for operating a battery is provided, which method is characterised in that the battery a) is discharged to most at a residual terminal voltage of 1.3 to 1.7 V, preferably 1.4 to 1.6 V, in particular 1.45 to 1.55 V; and/or b) is charged up to a maximum terminal voltage of 2.4 to 2.8 V, preferably of 2.5 to 2.7 V, in particular of 2.55 to 2.65 V.

The battery according to the disclosure can be operated during use with high discharging rates and/or charging rates of at least 150-170 mA/g of sulphur. For example discharging rates of up to 836 mA/g of sulphur have been reached.

FIG. 1 describes the charging efficiency and discharging capacity of a Li—S battery according to the disclosure from Example 1, see Examples below. The measured charging efficiency and discharging capacity are indicated as a function of the number of discharging cycles. It becomes clear that the charging efficiency over 1,400 cycles remains almost constant at 1,000 mAh/g (and hence at almost 100% CE), whilst, in the case of the battery from the state of the art, a clear reduction in charging efficiency can be observed in the course of the cycles. The capacity of the battery according to the disclosure decreases continuously in fact over the 1,400 charging cycles, but to a small extent relative to the state of the art. After 1,400 cycles, the capacity, relative to the mass of the sulphur, is still 380 mAh/g. According to the state of the art, Li—S cells generally lose capacity drastically after approx. 200 cycles (above all because of degradation/dendrites on the anode side).

Figure 2:
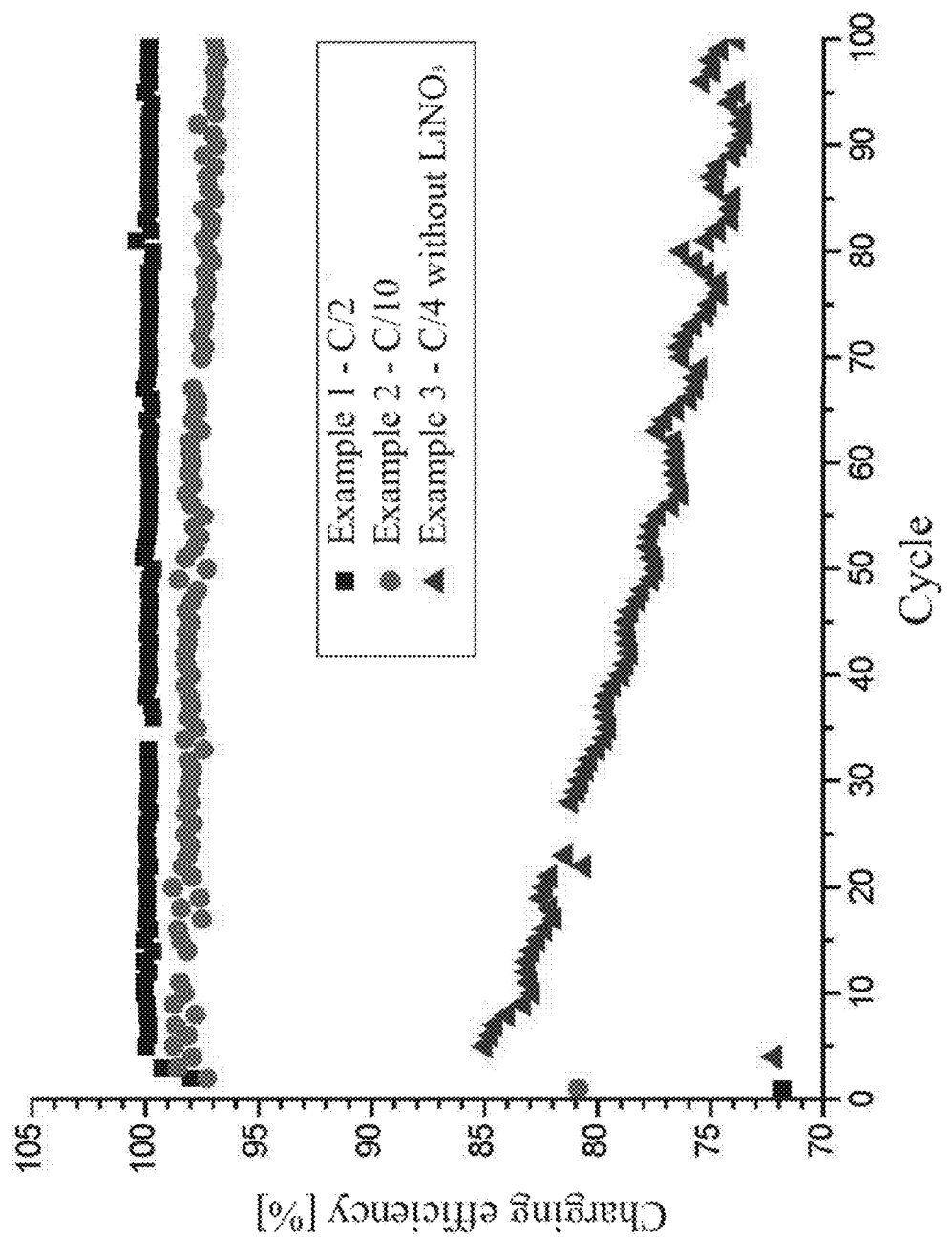
FIG. 2 is a diagram illustrating the influence of lithium nitrate in the electrolyte on the charging efficiency of one of the Li—S batteries according to the disclosure, given by way of example.

FIG. 2 describes the Coulomb efficiency of Li—S batteries according to the disclosure which comprise lithium nitrate in the electrolyte or comprise no lithium nitrate in the electrolyte. It becomes clear that lithium nitrate in the electrolyte causes a stabilising effect on the charging efficiency of the battery so that the charging efficiency can be kept constant for a plurality of charging and discharging cycles.

Example 1

Anode fibrillar carbon anode 0.74 mg comprising Si as magnetron-sputtered coating (coating thickness: 4 μm) of the company SGL Carbon SE (trade name GDL 10AA)
anode diameter: 10 mm
total mass with current conductor: 7.5 mg
Cathode:
Cathode comprising
   53.3% by weight of sulphur (=1.3 mg)
   26.7% by weight of carbon hollow balls
   10% by weight of polytetrafluoroethylene (PTFE)
   10% by weight of carbon nanotubes (CNT)
cathode diameter: 10 mm
Electrolyte:
36 μl 1 M LiTFSI, 0.25 M LiNO$_3$ in DME:DOL (1:1 vol)
Further Components:
CR2016 Coincell (round cell of the dimension (form factor) 2016 (20 mm diameter, 1.6 mm height).
Celgard® 2500 (porous PP film with a thickness of 25 μm and an average pore diameter of 64 nm and also an average porosity of 55%)
Discharging/Charging of the Battery
First three cycles at a discharging-/charging current of 167 mA/g of sulphur, then with a discharging-/charging current of 836 mA/g of sulphur Example 2

Anode

SGL GDL 10AA fibrillar carbon anode 0.74 mg comprising Si as magnetron-sputtered coating (coating thickness: 4 μm)
anode diameter: 10 mm
total mass with current conductor: 7.5 mg
Cathode:
Cathode Comprising
   53.3% by weight of sulphur (=1.1 mg)
   26.7% by weight of carbon hollow balls
   10% by weight of polytetrafluoroethylene (PTFE)
   10% by weight of carbon nanotubes (CNT)
cathode diameter: 10 mm
Electrolyte:
40 μl 1 M LiTFSI, 0.25 M LiNO$_3$ in DME:DOL (1:1 vol)
Further Components:
CR2016 Coincell
Celgard® 2500
Discharging/Charging of the Battery
Charging/discharging current 167 mA/g of sulphur Example 3

Without LiNO$_3$

Anode:
SGL GDL 10AA fibrillar carbon anode 0.74 mg comprising Si as magnetron-sputtered coating (coating thickness: 4 μm)
anode diameter: 10 mm
total mass with current conductor: 7.5 mg
Cathode:
Cathode Comprising
   53.3% by weight of sulphur (=1.9 mg)
   26.7% by weight of carbon hollow balls
   10% by weight of polytetrafluoroethylene (PTFE)
   10% by weight of carbon nanotubes (CNT)
cathode diameter: 10 mm
Electrolyte:
45 μl 1 M LiTFSI in DME:DOL (1:1 vol)
Further Components:
CR2016 Coincell
Celgard® 2500
Discharging/Charging of the Battery
Three cycles with discharging-/charging current of 84 mA/g of sulphur, thereafter discharging-/charging current at 418 mA/g of sulphur

The invention claimed is:

1. A Li—S battery, comprising:
   a cathode comprising at least one of an electrically conductive carbon material, an electrochemically active cathode material that comprises sulphur, and at least partially fibrillar plastic material;
   an anode comprising a conducting substrate which is coated at least in regions with at least one of silicon and tin; and at least one of a lithium-containing liquid electrolyte, gel electrolyte, and solid electrolyte disposed between the cathode and the anode.

2. The battery according to claim 1, wherein the cathode, relative to the total weight of the cathode, comprises at least one of:
at least one of 40-90% by weight, 50-80% by weight, and 60-75% by weight, of electrochemically active cathode material;
at least one of 1-55% by weight, 5-35% by weight, and 10-25% by weight, of electrically conductive carbon material; and
at least one of 0.5-30% by weight, 1-10% by weight, and 2-5% by weight, of plastic material.

3. The battery according to claim 1, wherein the cathode comprises at least one of:
an electrochemically active cathode material comprising at least one of sulphur, a lithium-sulphur compound, and $Li_2S$;
as electrically conductive carbon material at least one of porous carbon, carbon black, graphene, graphite, diamond-like carbon (DLC), graphite-like carbon (GLC), carbon fibres, carbon nanotubes, and carbon hollow balls; and
as fibrillar plastic material, fibrillar polytetrafluoroethylene.

4. The battery according to claim 3, wherein at least one of:
the carbon nanotubes have a diameter in a range of at least one of 0.1 to 100 nm, 1 to 50 nm, and 5 to 25 nm; and
the carbon fibres have a diameter in a range of at least one of 1 to 100 μm, 5 to 50 μm, and 10 to 20 μm.

5. The battery according to claim 1, wherein the cathode is configured as a film having a thickness in a range of at least one of 20-1,000 μm, 50-500 μm, and 80-300 μm, applied on at least one of an electrically conductive substrate, a metal and carbon material.

6. The battery according to claim 1, wherein at least one of the electrochemically active cathode material is applied at least in regions on the surface of the electrically conductive carbon material, and the electrically conductive carbon material is applied on the surface of the active cathode material.

7. The battery according to claim 1, wherein the coating of the anode is at least one of a conformal coating, a PVD coating, a CVD coating, and a PE-CVD coating.

8. The battery according to claim 1, wherein the conducting substrate of the anode is in the form of fibres.

9. The battery according to claim 8, wherein the fibres have a diameter in a range of at least one of 1 to 500 μm, 5 to 50 μm, and 10 to 20 μm.

10. The battery according to claim 1, wherein the coating of the anode has a thickness in the range of at least one of 0.1 to 50 μm, 0.5 to 20 μm, and 0.5 to 2 μm.

11. The battery according to claim 1, wherein the fibrillar, conducting substrate of the anode comprises a material selected from the group consisting of carbon, graphite, graphene, diamond-like carbon (DLC), carbon black, and carbon nanotubes.

12. The battery according to claim 1, wherein the anode comprises at least one of silicon and tin in a total quantity, relative to the total mass of the anode, of at least one of 0.1 to 90% by weight, 20 to 80% by weight, and 40 to 70% by weight.

13. The battery according to claim 1, wherein the anode is lithiated.

14. The battery according to claim 1, wherein the anode has a total thickness in a range of at least one of 10 to 1,000 μm, 20 to 500 μm, and 50 to 120 μm.

15. The battery according to claim 1, wherein the electrolyte is selected from the group consisting of at least one of solutions and suspensions of at least one lithium salt in at least one of a cyclic and a non-cyclic ether, in at least one of solutions and suspensions of at least one of lithium-bis(trifluoromethanesulphonyl)imide (LiTFSI), lithium trifluoromethanesulphonate and lithium nitrate, and in at least one of dimethoxyethane (DME), tetraethylene glycol dimethyl ether (TEGDME) and 1,3-dioxolane (DOL).

16. The battery according to claim 1, wherein at least one separator is disposed between the cathode and the anode, the at least one separator comprising a permeable film made of a thermoplastic material including at least one of PE, PP and PET.

17. The battery according to claim 1, wherein the capacity of the anode is over-dimensioned relative to the capacity of the cathode by at least one of at least 10%, at least 50%, and at least 70%.

18. A method for operating a Li—S battery comprising:
a cathode comprising at least one of an electrically conductive carbon material, an electrochemically active cathode material that comprises sulphur, and at least partially fibrillar plastic material;
an anode comprising a conducting substrate which is coated at least in regions with at least one of silicon and tin; and
at least one of a lithium-containing liquid electrolyte, gel electrolyte, and solid electrolyte disposed between the cathode and the anode, wherein the method comprises at least one of:
discharging the battery at most to a residual terminal voltage of at least one of 1.3 to 1.7 V, 1.4 to 1.6 V, and 1.45 to 1.55 V; and
charging the battery up to a maximum terminal voltage of at least one of 2.4 to 2.8 V, 2.5 to 2.7 V, and 2.55 to 2.65 V.

* * * * *